United States Patent [19]
Fujii et al.

[11] Patent Number: 5,452,047
[45] Date of Patent: Sep. 19, 1995

[54] AUTOMATIC EXPOSURE CONTROLLING DEVICE FOR A CAMERA

[75] Inventors: Hidehiko Fujii, Sakai; Kenji Tsuji, Kashiwara; Kenji Ishibashi, Sakai; Tatsuya Suzuki, Kawachinagano; Katsuyuki Nanba, Sakai, all of Japan

[73] Assignee: Minolta Camera Kabushiki Kaisha, Osaka, Japan

[21] Appl. No.: 151,058

[22] Filed: Nov. 12, 1993

Related U.S. Application Data

[63] Continuation of Ser. No. 736,428, Jul. 26, 1991, abandoned.

[30] Foreign Application Priority Data

Jul. 27, 1990 [JP] Japan .................. 2-200620

[51] Int. Cl.⁶ ............................................ G03B 13/36
[52] U.S. Cl. ......................... 354/402; 354/441; 354/430
[58] Field of Search ............... 354/402, 403, 400, 412, 354/410, 422, 420, 423, 471, 472, 473, 474, 465, 430, 446, 456, 441

[56] References Cited

U.S. PATENT DOCUMENTS

| | | | |
|---|---|---|---|
| 4,974,011 | 11/1990 | Azuma | 354/412 |
| 4,984,006 | 1/1991 | Ikemura et al. | 354/42 X |
| 5,019,852 | 5/1991 | Yamamoto et al. | 354/465 |
| 5,084,724 | 1/1992 | Maeno | 354/430 |
| 5,091,742 | 2/1992 | Fukahori et al. | 354/446 |
| 5,103,254 | 4/1992 | Bell et al. | 354/409 |
| 5,107,293 | 4/1992 | Sekine et al. | 354/430 |
| 5,162,834 | 11/1992 | Kichima | 354/400 |
| 5,170,201 | 12/1992 | Akiyama et al. | 354/400 |
| 5,191,372 | 3/1993 | Aihara | 354/400 |

*Primary Examiner*—Russell E. Adams
*Attorney, Agent, or Firm*—Burns, Doane, Swecker & Mathis

[57] ABSTRACT

A device determines an aperture value Av and a time value Tv for controlling exposure, on the basis of the detected focal length, the detected image magnification and brightness of an object. First, a type of photography is determined according to the focal length (f) and a image magnification $\beta$, on the basis of fuzzy logic. Then, a combination of an aperture value Av and a time value Tv which are proper for the so-determined type of photography is automatically determined. The combination can be changed by a manual operation. If the combination is changed, a display showing a depth of field corresponding to the changed aperture value Av is indicated.

12 Claims, 13 Drawing Sheets

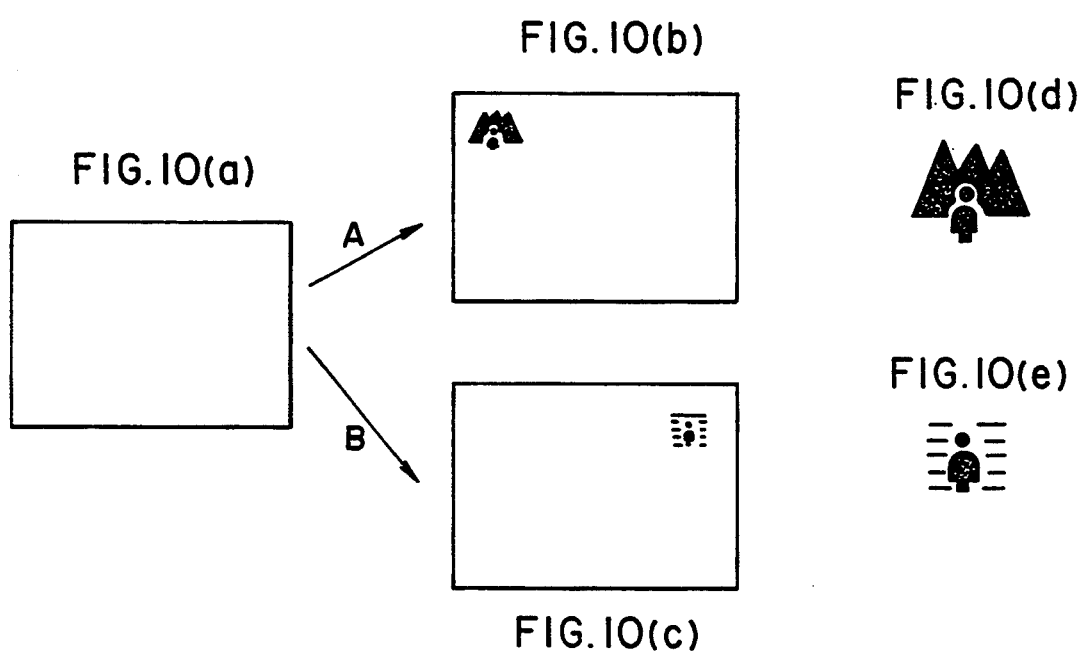
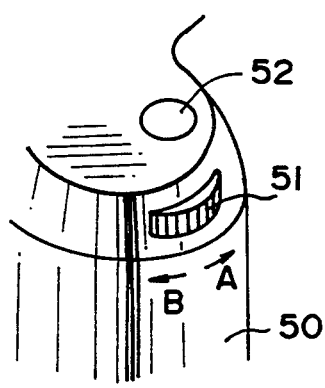
FIG.11

AUTOMATIC EXPOSURE CONTROLLING DEVICE FOR A CAMERA

This application is a continuation of application Ser. No. 07/736,428, filed Jul. 26, 1991, abandoned.

BACKGROUND OF THE INVENTION

1. Field of the Invention

The present invention relates to an automatic exposure controlling device for a camera which is used to automatically determine a shutter speed and an aperture opening in a camera.

2. Description of the Related Art

An automatic exposure controlling device which measures object brightness, calculates the most suitable exposure value (hereinafter, referred to as "exposure value") according to the measured light value and a film sensitivity, and automatically sets an aperture value Av and a time value Tv based on the exposure value is known in the art. In the device, a program line showing a relationship between an exposure value and a combination of an aperture value Av and a time value Tv is set in advance, so that an aperture value Av and a time value Tv are determined based on an exposure value according to the set program line. Further, an automatic exposure controlling device which comprises a telephoto program suitable for a telephoto lens, a standard program suitable for a standard lens and a wide angle program suitable for a wide angle lens, and which selects one of the programs according to the focal length of a camera lens, is also known.

In photography, the most suitable combination of an aperture value Av and a time value Tv is different for every type of photography situation such as snapshot photography, portrait photography, close-up photography or scenery photography. But in the above mentioned automatic exposure controlling device, an aperture value Av and a time value Tv are determined without regard to the above mentioned type of photography, so that photography can not be carried out at a proper aperture value Av and a proper time value Tv for each different type of photography. Therefore, an exposure control device has been developed in which data for determining a proper aperture value Av and a proper time value Tv for each type of photography is stored in IC cards. An aperture value Av and a time value Tv are determined based on the stored data in the IC card which is mounted in a camera. Namely, in the known device, for example, data for determining a proper aperture value Av and a proper time value Tv for portrait photography or close-up photography is stored in the IC card for portrait photography or close-up photography respectively. However, in this case, a photographer is required to determine the type of photographic situation at hand and select a proper IC card for that situation. Moreover, in this case, a photographic opportunity is sometimes missed in changing an IC card.

SUMMARY OF THE INVENTION

An object of the present invention is to provide an automatic exposure controlling device in a camera which is, by changing a ratio of a shutter speed and an aperture value on the basis of the focal length of a camera lens and an image magnification, capable of taking expressive photographs without mistakes according to a particular type of photography with no operation by a photographer.

Another object of the present invention is to provide an automatic exposure controlling device in a camera in which fuzzy logic is used so that an exposure control value will be continuous although the focal length of a camera lens and an image magnification will change.

The present invention provides a camera with an exposure controlling device comprising: a focal length detecting mean for detecting the focal length of a camera lens; a photography magnification detecting means for detecting a photography magnification; a discriminating means for discriminating a type of photography; a calculating means for calculating at least an aperture value on the basis of said type of photography; and an exposure controlling measure for controlling exposure according to said aperture value.

Other objects and advantages of the present invention will become apparent from the detailed description to follow taken in conjunction with the appended claims.

BRIEF DESCRIPTION OF THE DRAWINGS

FIG. 10 is an illustration showing displays in a viewfinder in the first embodiment.

FIG. 11 is a partial illustration of a camera comprising the exposure controlling device in the first embodiment.

EMBODIMENT

Figure 1:
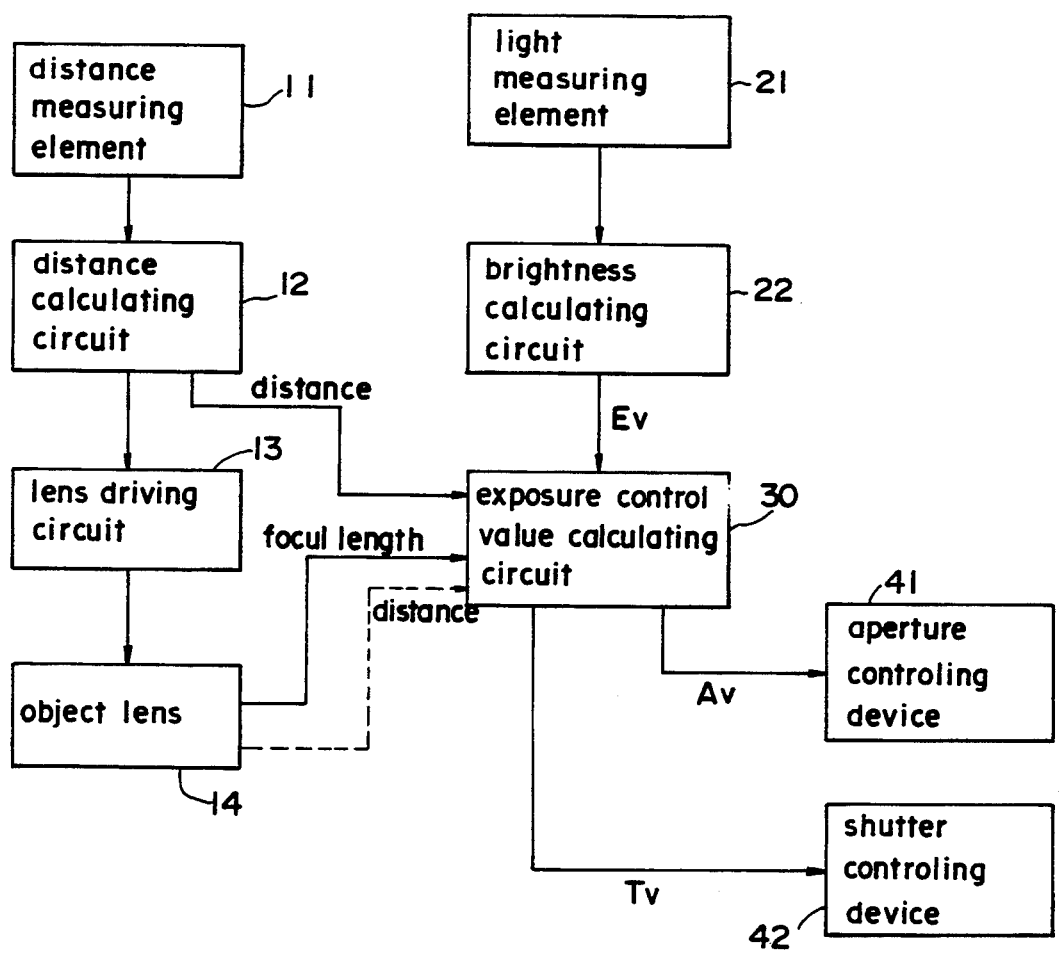
FIG. 1 is a block diagram of an exposure controlling device in the first embodiment of the present invention.

FIG. 1 is a block diagram showing the schematic composition of a camera in the first embodiment of the present invention. The camera comprises the distance measuring elements 11 for automatically focusing and the light measuring elements 21 for auto exposure. The distance measuring elements 11 are comprised of a well-known AF sensor using the TTL system and detect information about the distance of an object existing within the distance measuring area in a scene to be photographed. The distance calculating circuit 12 controls the distance measuring elements 11 so as to calculate and output the distance information of the object. The light measuring elements 21 measure the brightness of an object existing within the light measuring area in a scene to be photographed and output information corresponded to the brightness. The brightness calculating circuit 22 controls the light measuring elements 21 so as to calculate the brightness information Bv of the object. And on the basis of the brightness information Bv and the film sensitivity information Sv, the brightness calculating circuit 22 calculates and outputs the exposure value Ev (=Bv+Sv) of the object. The output from the distance calculating circuit 12 is also inputted to the lens driving circuit 13 for automatic focusing. The lens driving circuit 13 drives a focusing lens, which is disposed in the photography lens 14, to a position in focus on the basis of the object distance information outputted from the distance calculating circuit 12. The focal length of the photography lens 14 is changeable. Focal length information of the photography lens 14 is detected by a zoom encoder and inputted into the exposure control value calculating circuit 30. Not only the focal length information of the photography lens 14 but also the object distance information calculated by the distance calculating circuit 12 and the exposure value calculated by the brightness calculating circuit 22 are inputted into the exposure control value calculating circuit 30. On the basis of these items of information, the exposure control value calculating circuit 30 calculates an aperture value and a time value. According to the calculated aperture value, the aperture controlling device 41 controls the aperture, and according to the calculated time value, the shutter controlling device 42 controls the shutter.

The distance information is outputted from the distance calculating circuit 12. And the distance information can be calculated based on the focusing lens position of the photography lens.

Figure 2:
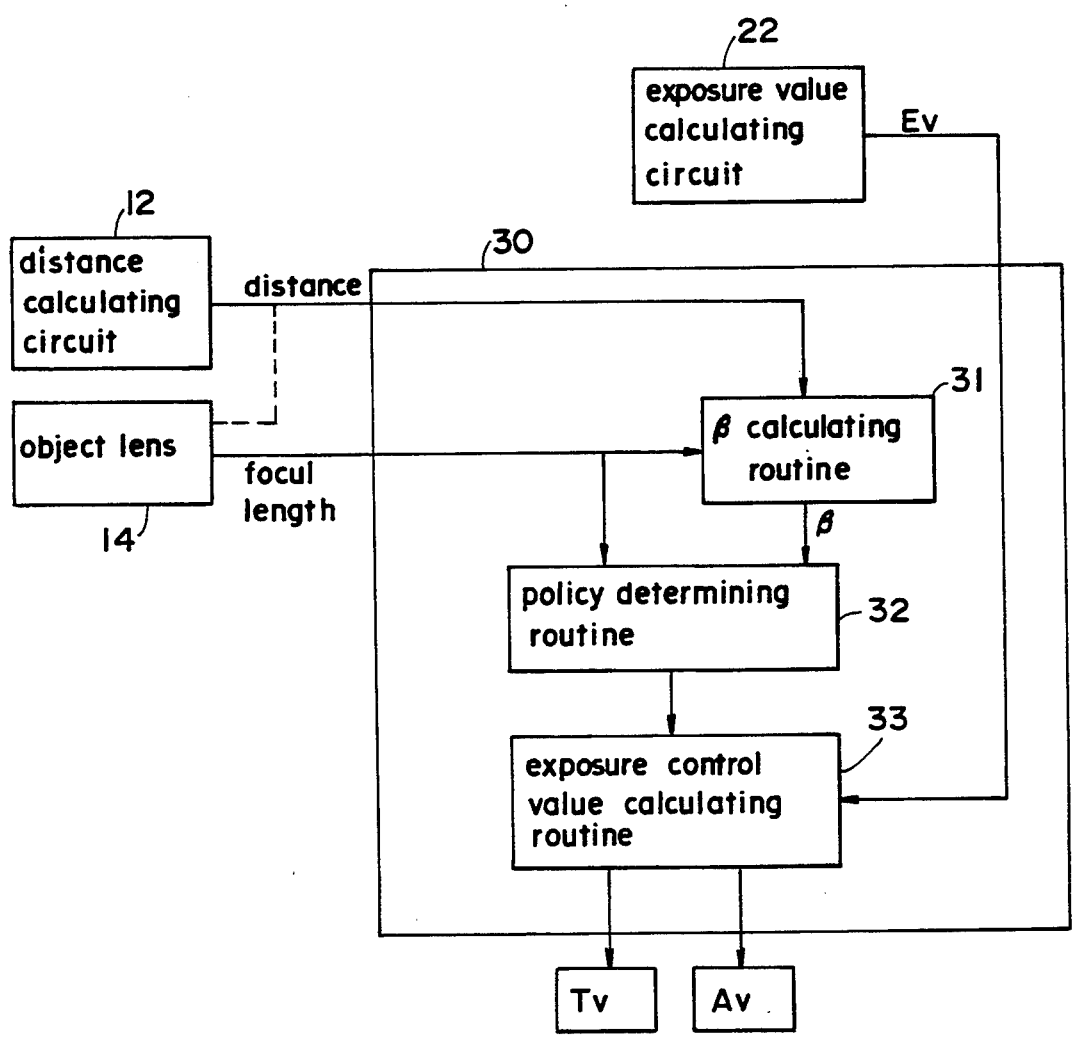
FIG. 2 is a block diagram showing a part of the block diagram in FIG. 1 in detail.

FIG. 2 is a block diagram showing the composition of the exposure control value calculating circuit 30. The calculating circuit 30 is actually comprised of software, but for the convenience of explanation, functions of the software are shown in a block diagram. First, on the basis of the distance information by the distance calculating circuit 12 and the focal length information by the photography lens 14, an image magnification is calculated by the image magnification calculating routine 31. As is well known, the image magnification $\beta$ can be calculated by $\beta = f/D$ wherein (f) represents focal length of the photography lens 14 and D represents photography distance of the object. Then, on the basis of the calculated image magnification and the focal length information inputted from the photography lens 14, the exposure control value calculating policy determining routine 32 determines a policy of exposure control value calculation, that is, each rate of the time value Tv and the aperture value Av to the exposure control value Ev. According to the policy, in the exposure control value calculating routine 33, the exposure value Ev inputted from the brightness calculating circuit 22 is divided into the time value Tv and the aperture value Av.

Figure 3:
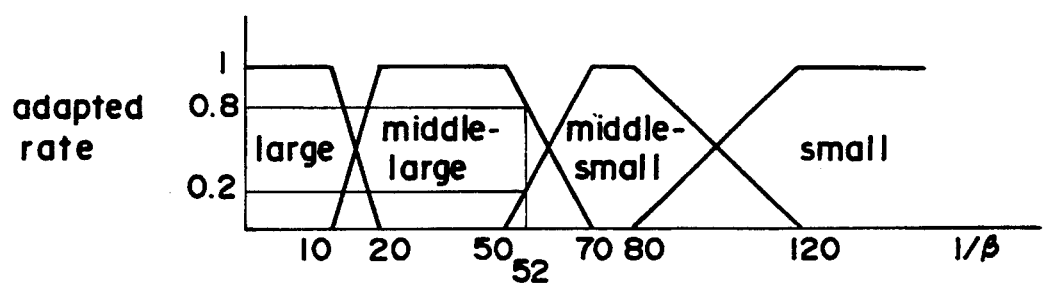
FIG. 3 is a graph of a membership function of photography magnification in the first embodiment.
Figure 4:
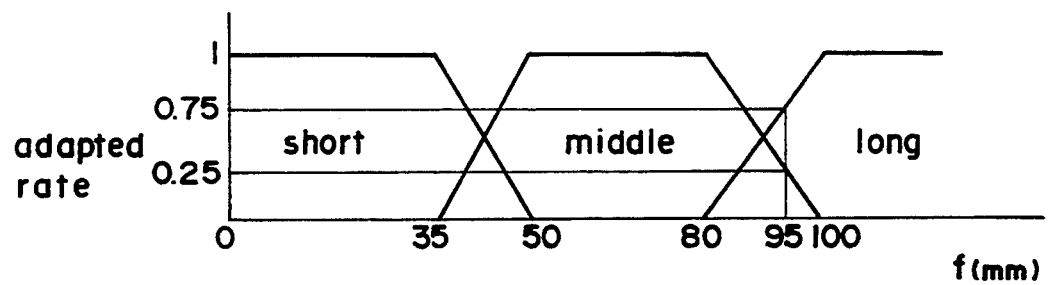
FIG. 4 is a graph of a membership function of a focal length in the first embodiment.

The exposure control value calculating policy determining routine 32 determines a policy of exposure control value calculation by using fuzzy logic. The calculation performed in the routine is explained hereinafter. As shown in FIGS. 3 and 4, membership functions concerning the image magnification $\beta$ and the focal length (f) are divided into plural ranges. In the membership functions, adapted rates of the input image magnification $\beta$ and focal length (f) are shown. In the case of the membership functions shown in FIGS. 3 and 4, the image magnification $\beta$ is divided into four ranges: large, middle-large, middle-small and small; the focal length (f) is divided into three ranges: short, middle and long. For example, when the image magnification $\beta = 1/52$ and the focal length (f)=95 mm, each adapted rate of the image magnification $\beta$ and the focal length (f) to the membership functions is as follows.

In the membership function of the image magnification $\beta$, the adapted rate to "$\beta$=large" is 0, the adapted rate to "$\beta$=middle-large" is 0.8, the adapted rate to "$\beta$=middle-small" is 0.2 and the adapted rate to "$\beta$=small" is 0. In the membership function of the focal length (f), the adapted rate to "(f)=short" is 0, the adapted rate to "(f)=middle" is 0.25 and the adapted rate to "(f)=long" is 0.75.

Then, on the basis of the adapted rates, the exposure control value calculating policy is determined. In the embodiment, as shown in Table 1, aperture degrees are predetermined corresponding to each combination of the image magnification $\beta$ and the focal length (f). For the aperture degree, five steps are set: small, relatively small, middle, relatively large and large.

TABLE 1

| f | β |  |  |  |
|---|---|---|---|---|
|   | large | middle-large | middle-small | small |
| short | middle | relatively small | relatively small | relatively small |
| middle | relatively small | relatively large | middle | small |
| long | small | large | relatively large | small |

The aperture degrees are for expressively photographing in each combination of the image magnification and the focal length (f), and are determined based on the idea shown in FIG. 9 from (a) to (c) which will be mentioned later. On the basis of the above mentioned adapted rates the, weight for each aperture degree is calculated. Namely, the smaller adapted rate between the image magnification $\beta$ and the focal length (f) is elected as the weight for every combination of the image magnification and the focal length (f). The above mentioned method is called "minimum method". For example, when the image magnification $\beta = 1/52$ and the focal length (f)=95 mm, the result is as follows.

When the combination is "$\beta$=middle large" and "(f)=middle", the aperture degree is "relatively large" and the weight is 0.25 because 0.25 is smaller than 0.8. When the combination is "$\beta$=middle large" and "(f)=long", the aperture degree is "large" and the weight is 0.75 because 0.75 is smaller than 0.8. When the combination is "$\beta$=middle-small" and "(f)=middle", the aperture degree is "middle" and the weight is 0.2 because 0.2 is smaller than 0.25. When the combination is "$\beta$=middle-small" and "(f)=long", the aperture degree is "relatively large" and the weight is 0.2 because 0.2 is smaller than 0.75.

Therefore, the total weight in the aperture degree "relatively large" is 0.25+0.2=0.45; the total weight in the aperture degree "large" is 0.75; and the total weight in the aperture degree "middle" is 0.2.

TABLE 2

| | β | | | |
|---|---|---|---|---|
| f | large 0 | middle-large 0.8 | middle-small 0.2 | small 0 |
| short 0 | middle 0 | relatively small 0 | relatively small 0 | relatively small 0 |
| middle 0.25 | relatively small 0 | relatively large 0.25 | middle 0.2 | small 0 |
| long 0.75 | small 0 | large 0.75 | relatively large 0.2 | small 0 |

Figure 5:
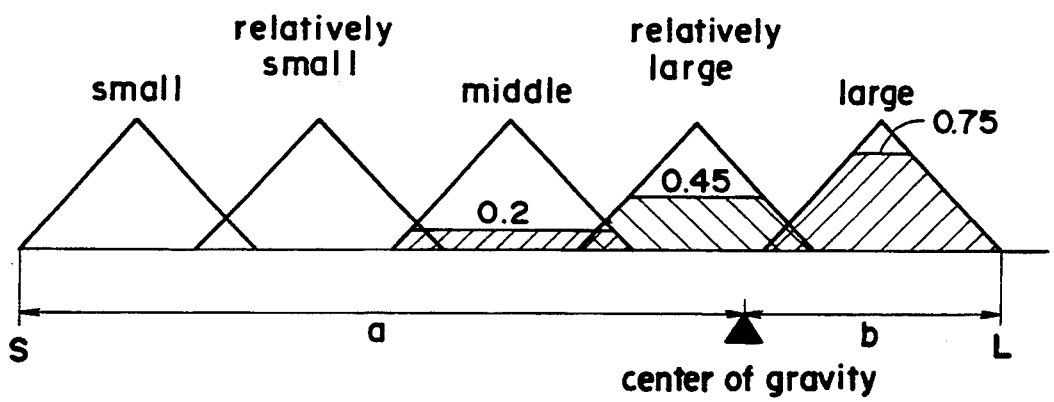
FIG. 5 (a) shows the content of calculating in the exposure control value calculating policy determining routine in the first embodiment.

Then, as shown in FIG. 5, the point of the weight center of gravity in the aperture degrees is calculated. The ratio of the length (a) between the control point S where the diameter of the aperture opening is shortest and the point of the center of gravity to the length (b) between the control point L where the diameter of the aperture opening is longest and the point of the center of gravity, namely the ratio (a):(b), is regarded as the exposure control value calculating policy. For example, when the image magnification $\beta=1/52$ and the focal length (f)=95 mm, (a):(b)=3.4:0.6.

Figure 6:
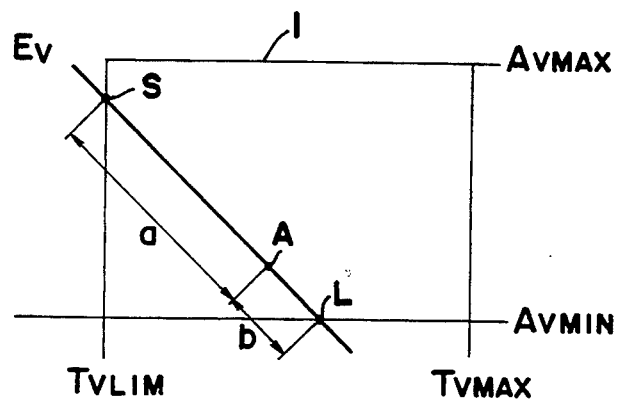
FIG. 6 shows the content of calculating in the exposure control value calculating routine in the first embodiment.
Figure 7:
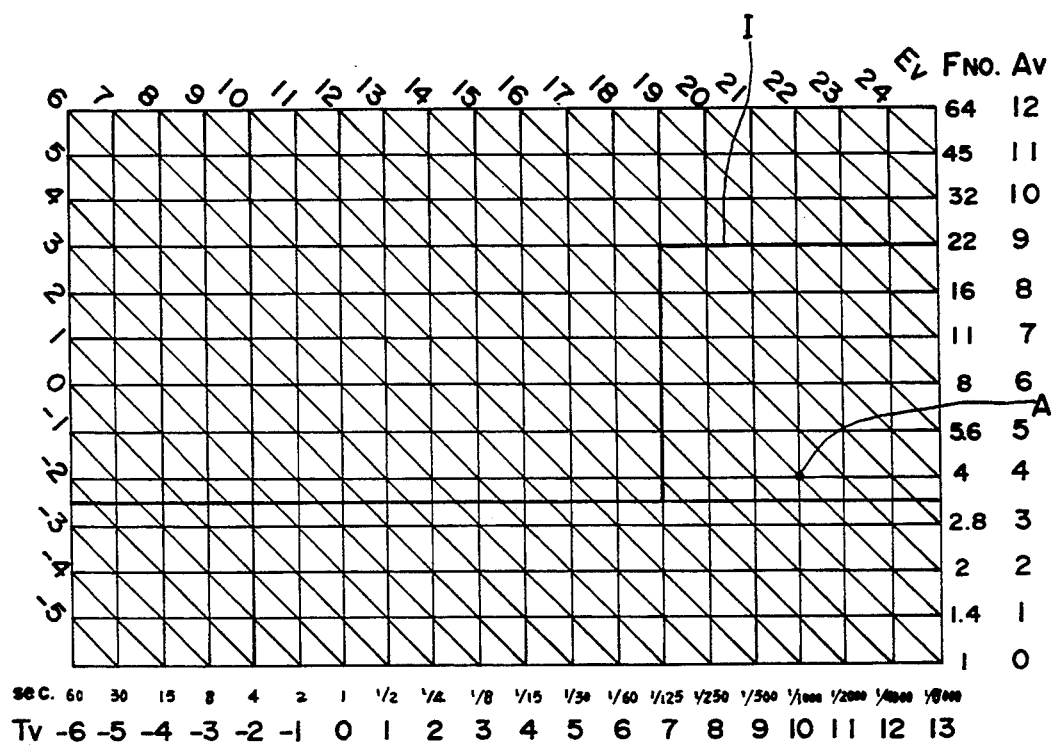
FIG. 7 is a program graph showing combinations of an aperture value Av and a time value Tv which are determined in the first embodiment.

FIG. 6 shows the relationship between the range I and the control value A in FIG. 7. The range I is enclosed by a lower limit time value TvLIM at which camera shake will not blur a photograph and a minimum aperture value AvMIN. The point S denotes a combination of the minimum aperture in the range I among the combinations of an aperture value Av and a time value Tv in which an exposure value is Ev. The point L denotes a combination of the maximum aperture in the range I among the combinations of an aperture value Av and a time value Tv in which an exposure value is Ev. The point A divides the segment SL in the ratio of a:b. The combination of an aperture value Av and a time value Tv which corresponds to the point A is an exposure control value.

For example, in the case that the image magnification $\beta=1/52$ and the focal length (f)=95 mm, when a lower limit shutter speed at which camera shake will not blur a photograph is 1/125 sec., the higher limit shutter speed is 1/8000 sec., a maximum F No. is 3.5, a smallest F No. is 22 and an exposure value is Ev 14, the exposure control value is 1/1000 sec. of the shutter speed and 4 of the F No. as shown in FIG. 7 as a point A. The lower limit shutter speed at which camera shake will not blur a photograph can be set at about 1/(f) [sec.] wherein a focal length of a camera lens is denoted by (f) [mm].

The second embodiment

Figure 8:
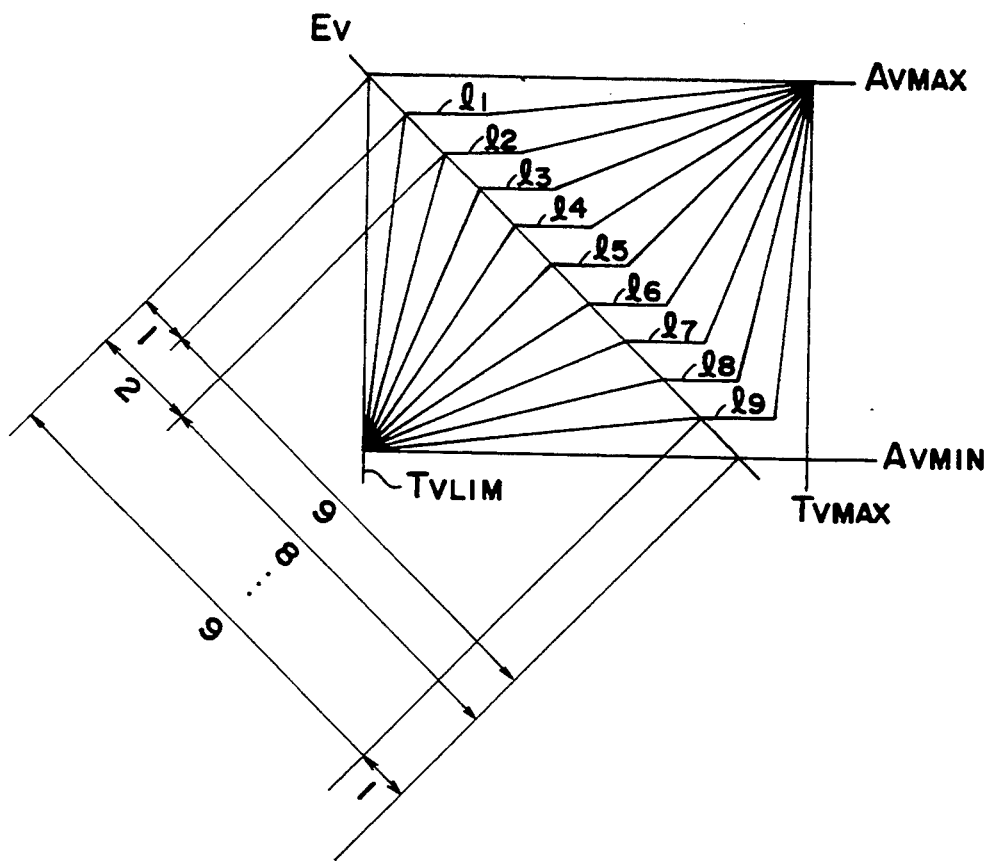
FIG. 8 is a program graph showing relationships between an aperture value Av and a time value Tv in the second embodiment.

The second embodiment is described hereinafter. In FIG. 8, $l_1$ to $l_9$ show program lines which are connected points of a combination of an aperture value Av and a time value Tv. In the combinations, the ratio of an aperture value Av to a time value Tv is such as 1 to 9, 2 to 8, 3 to 7, . . . or 9 to 1. In this manner, plural program lines can be set in advance so that first, a program line corresponding to the calculated ratio should be selected and then, a combination corresponding to an exposure value Ev should be determined.

As above described, in these embodiments, an exposure control value calculating policy is determined depending on an aperture degree. The aperture degrees corresponding to the combinations of the image magnification β and the focal length (f) shown in Table 1 are determined on the basis of the following ideas.

Figure 9A:
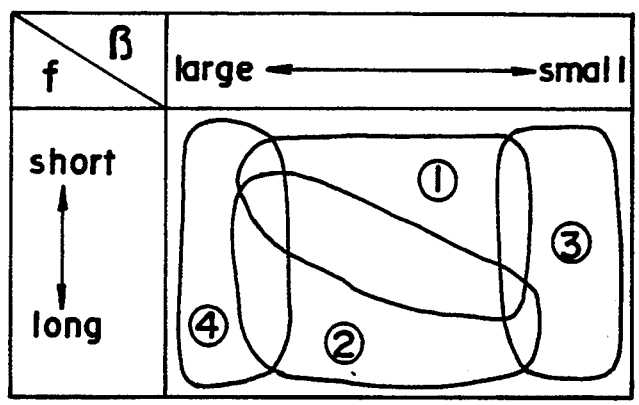
FIG. 9 (a)-(c) are diagrams showing relationships between types of photography and combinations of a focal length (f) and an image magnification $\beta$.
Figure 9B:
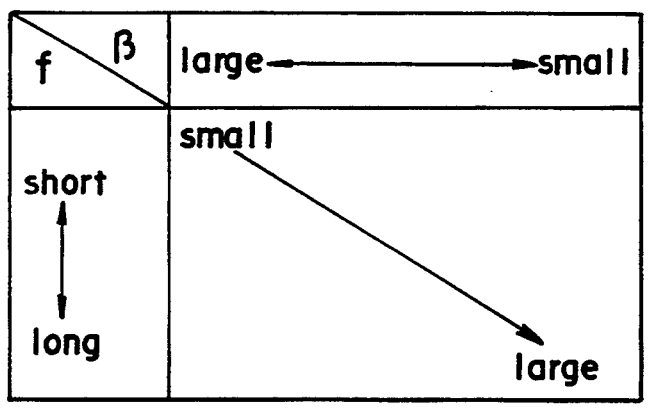
Figure 9C:
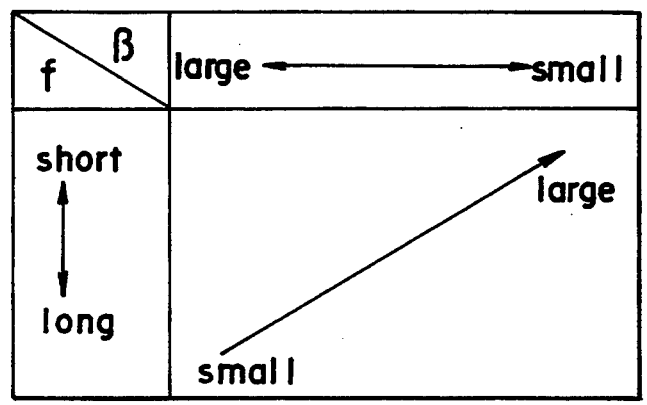

(i) An idea of controlling exposure in correspondence with the type of photograph (ii) An idea of controlling exposure with the best use of a lens characteristic (iii) An idea of focusing on a certain range Tendencies of aperture values respectively corresponding to the image magnification β and the focal length (f) in said ideas from (i) to (iii) are shown in FIG. 9 (a), (b) and (c).

(i) According to the frequency of use of the image magnification β and the focal length (f), aperture degrees in types of photography such as (1) snapshot photography (2) portrait photography (3) scenery photography (4) close-up photography are distributed as shown in FIG. 9 (a). In each type of photography the aperture degree for the most proper aperture effect is as follows.

(1) In snapshot photography, an aperture is rather small.

(2) In portrait photography, an aperture is rather large.

(3) In scenery photography, an aperture is rather small.

(4) In close-up photography, an aperture is rather small.

(ii) Controlling exposure with the best use of a lens characteristic as shown in FIG. 9 (b) means that an aperture opening is controlled to be relatively large so as to emphasize a shallow depth of field and take effect of blurring the background when the focal length of a photography lens is long, and that an aperture is controlled to be relatively small so as to emphasize a deep depth of field and take effect of panfocus when the focal length of a photography lens is short. In the exposure control, it is also considered that even if a focal the same, when an image magnification is large, a photograph is much blurred and when small, a photograph is less blurred.

(iii) FIG. 9 (c) shows controlling exposure for a fixed depth of field. When an image magnification is large and a focal length is long, the depth of field is shallow. When an image magnification β is small and a focal length is short, the depth of field is deep. Therefore, the aperture degree needs to incline as shown in FIG. 9 (c) for a fixed depth of field.

Considering the distribution and incline of aperture degree corresponding to image magnifications and focal lengths for the above three points (i), (ii) and (iii), the aperture degrees corresponding to image magnifications and focal lengths shown in Table 1 are determined.

A case of changing the position of the above mentioned point of the center of gravity by a manual operation is explained hereinafter. In FIG. 10, an embodiment of a display in a viewfinder is explained. When the automatic exposure control is carried out based on the above mentioned center of gravity, the display is not indicated in the viewfinder as shown in FIG. 10 (a). When a photographer wants to get a picture where the background is as sharp as the object, whether or not the point of the center of gravity calculated by the fuzzy logic is positioned somewhere, a display as shown in FIG. 10 (b) is indicated. When a photographer wants to get a picture where the main object rises from the background, a display as shown in FIG. 10 (c) is indicated. FIG. 10 (d) and (e) are magnified views of the displays shown in FIG. 10 (b) and (e) respectively.

Figure 12:
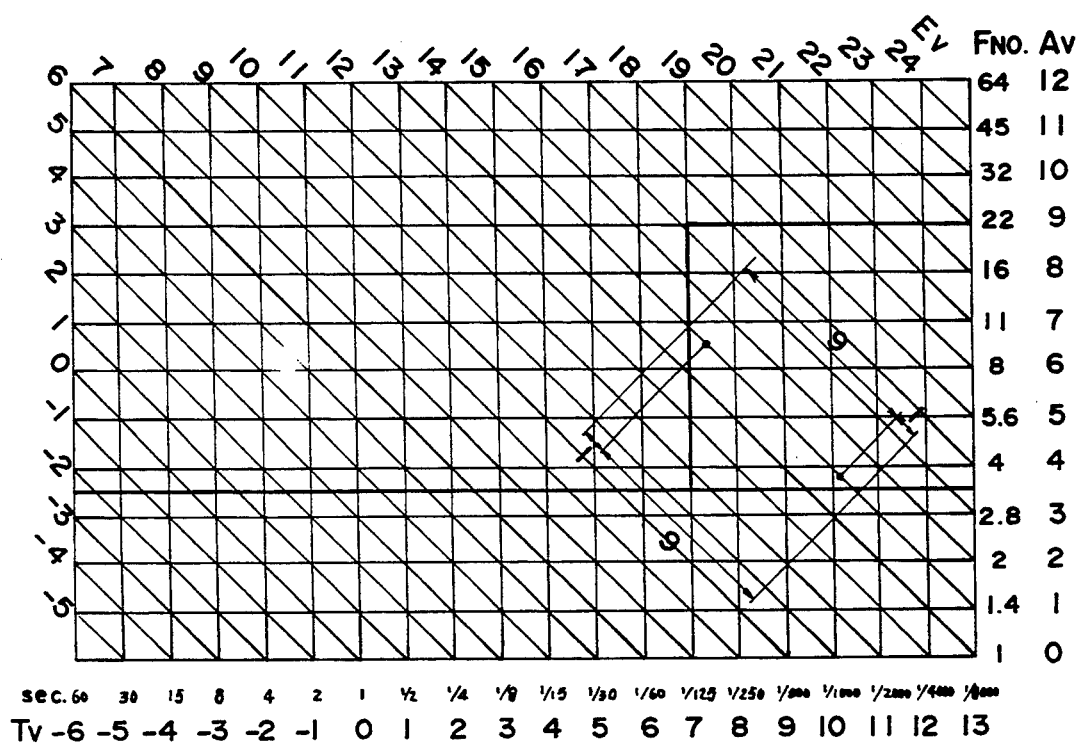
FIG. 12 is a program graph showing combinations of an aperture value Av and a time value Tv which re set manually in the first embodiment.

The way of determining exposure values when the above mentioned manual input is operated is explained with a program graph shown in FIG. 12. To photograph a picture where the background is as sharp as the object, the above mentioned ratio of an aperture value to a time value, a:b is for example set at 1:9 so that the aperture should be controlled to be closed enough. To photograph a picture where the main object rises from the background a:b is set at 9:1, contrary to the above case, so that the aperture should be controlled to be opened enough.

According to the above mentioned controlling criterion, a photographer can change intentionally the automatic exposure control value of a camera and produce a desirable aperture effect in a photograph.

Further, for manual input, it is suitable to use the up-down dial 51 provided in the grip 50 of a camera as shown in FIG. 11. When the dial 51 is used, the display indicates the picture shown in FIG. 10 (b) by turning the dial 51 one step in the direction of the arrow A, and the display indicates the picture shown in FIG. 10 (c) by turning dial 51 one step in the direction of the arrow B. And in either case, the display can be set to indicate the original picture shown in FIG. 10 (a) by turning the dial 51 one step in the reverse direction. The display can also be set to indicate the original picture shown in FIG. 10 (a) when the release button 52 is disengaged from a finger after exposing a film by depressing the release button 52.

The third embodiment

Figure 13:
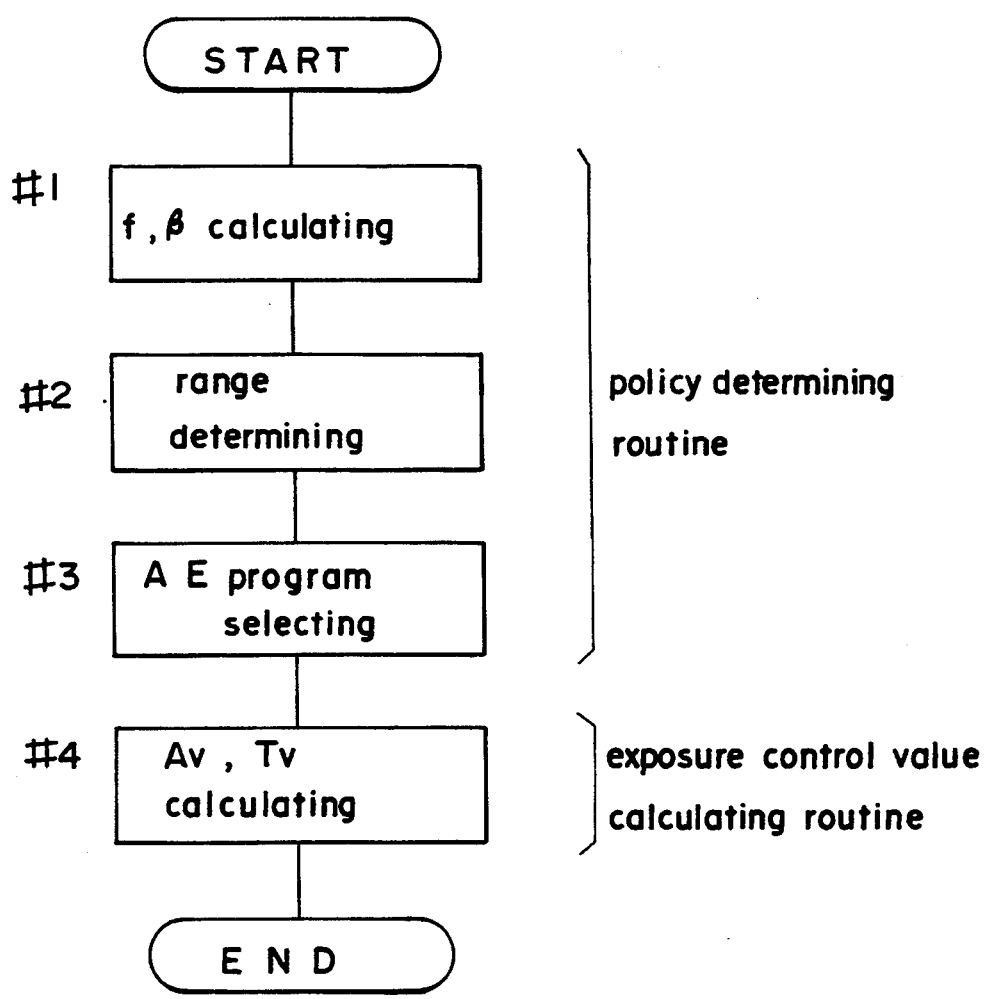
FIG. 13 is a flowchart showing the third embodiment.

The third embodiment for calculating exposure control value according to the image magnification $\beta$ and the focal length (f) is described hereinafter. As shown in FIG. 9, according to the types of photography (1), (2), (3) and (4), coordinates expressed by the image magnification $\beta$ and the focal length (f) are divided into eleven ranges, namely, the ranges (1) ∩ (2) ∩ (3) ∩ and (1) ∩ (2) ∩ (4), the following ranges except parts overlapped with each of the above mentioned ranges: (1) ∩ (2), (1) ∩ (3), (1) ∩ (4), (2) ∩ (3) and (2) ∩ (4) and the following ranges except parts overlapped with each of the above mentioned ranges: (1), (2), (3) and (4). For these ranges, programs for calculating exposure control value are set respectively. The exposure control value calculating policy determining routine 32 determines which range the coordinate (f,$\beta$) belongs in, and selects a program for calculating exposure control value in correspondence with the determined range (shown in FIG. 13 steps #1–#3) According to the chosen program, the exposure control value calculating routine 33 calculates the exposure control value (in step #4).

In the case that a camera does not have means for calculating an image magnification or that an image magnification $\beta$ can not be calculated exactly such as when a wide angle lens is used, an image magnification whose having the highest frequency of use in a camera lens can be adopted.

The fourth embodiment

Figure 14:
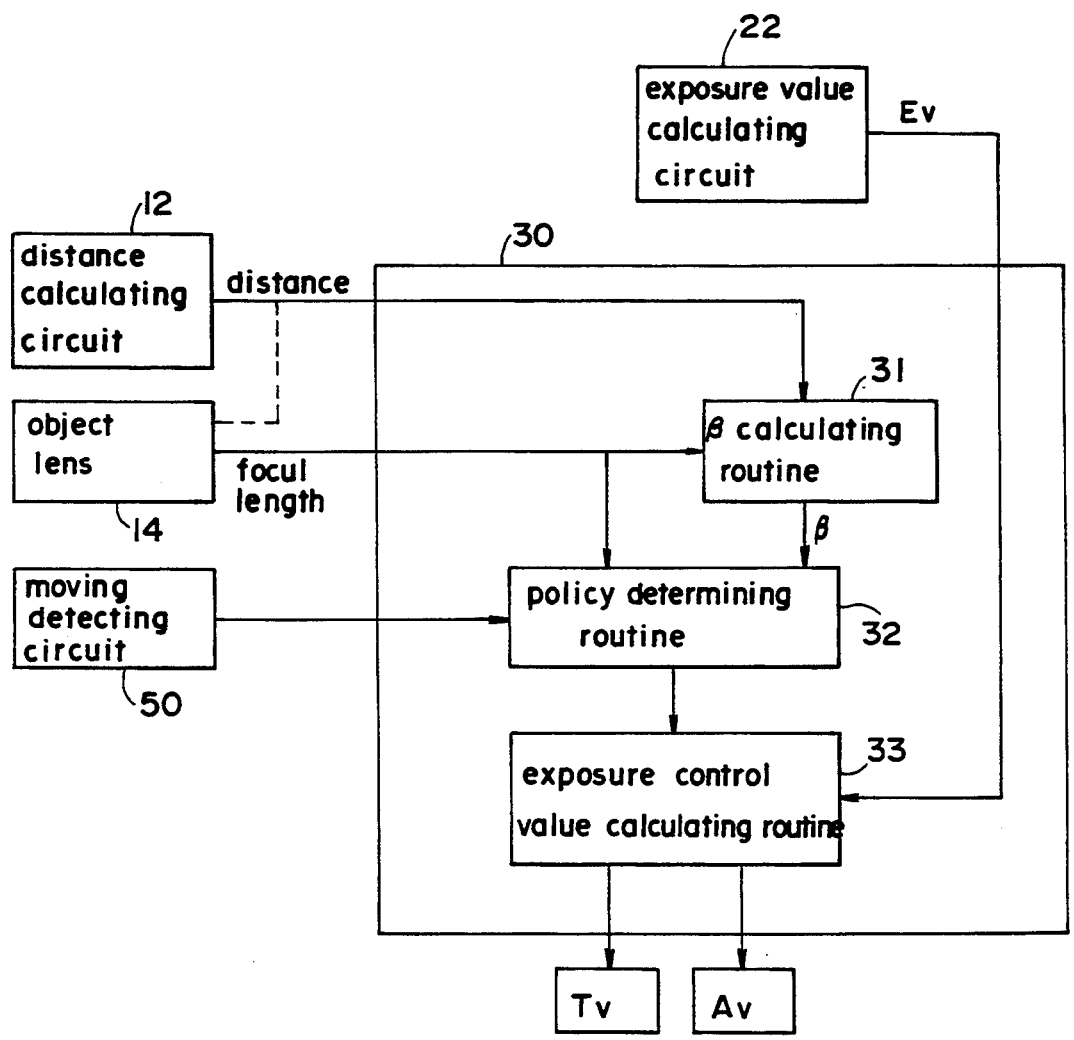
FIG. 14 is a block diagram in the fourth embodiment of the present invention.

The fourth embodiment is described hereinafter. In this embodiment, in addition to the first embodiment, a camera includes a moving object detecting device 50 for detecting a moving object (in FIG. 14). When an object is detected to be moving, a time value is determined relatively higher than when an object is detected to be still. The following example describes the case for a camera lens in which the focal length is 50 mm, the highest limit time value is 1/8000 sec., the smallest F No. of a photography lens is 1.4 and the largest F No. of a photography lens is 22.

Figure 15:
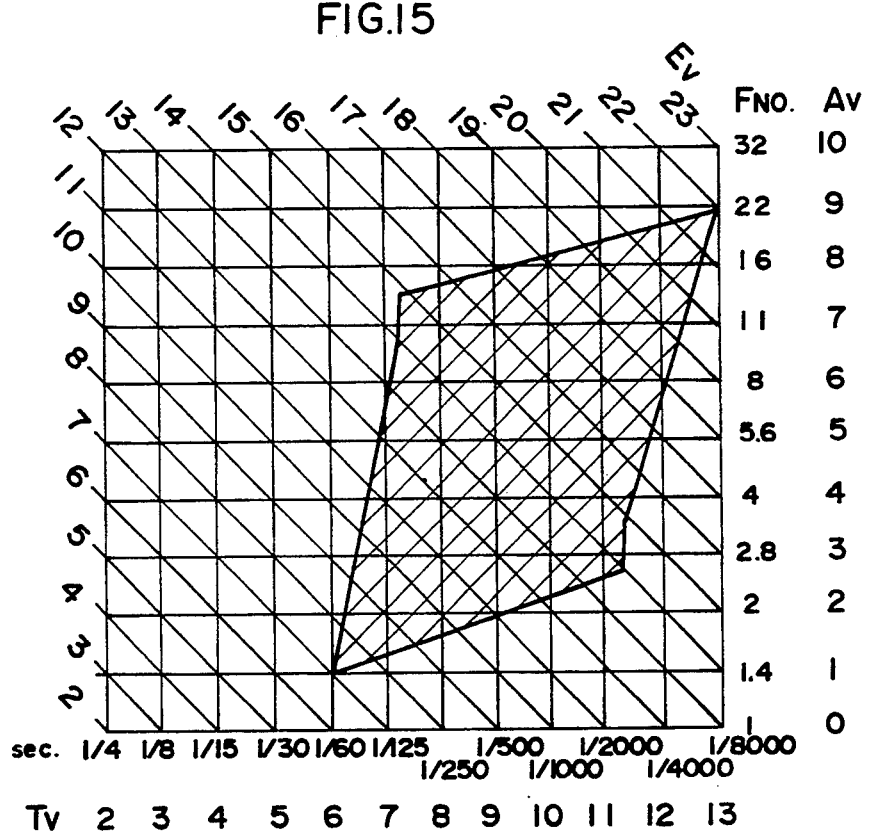
FIG. 15 and FIG. 16 are program graphs showing combinations of an aperture value Av and a time value Tv which are determined in the fourth embodiment of the present invention.

First, when an object is detected to be still, a combination of a time value and an aperture value is determined on the basis of the focal length (f) and the image magnification $\beta$ similar to the above described first embodiment. In the fourth embodiment, the above mentioned ratio a:b is limited to between 1:9 and 9:1. Therefore, a range of combinations of a time value and an aperture value which can be determined is shown by the hatched area in FIG. 15.

Figure 16:
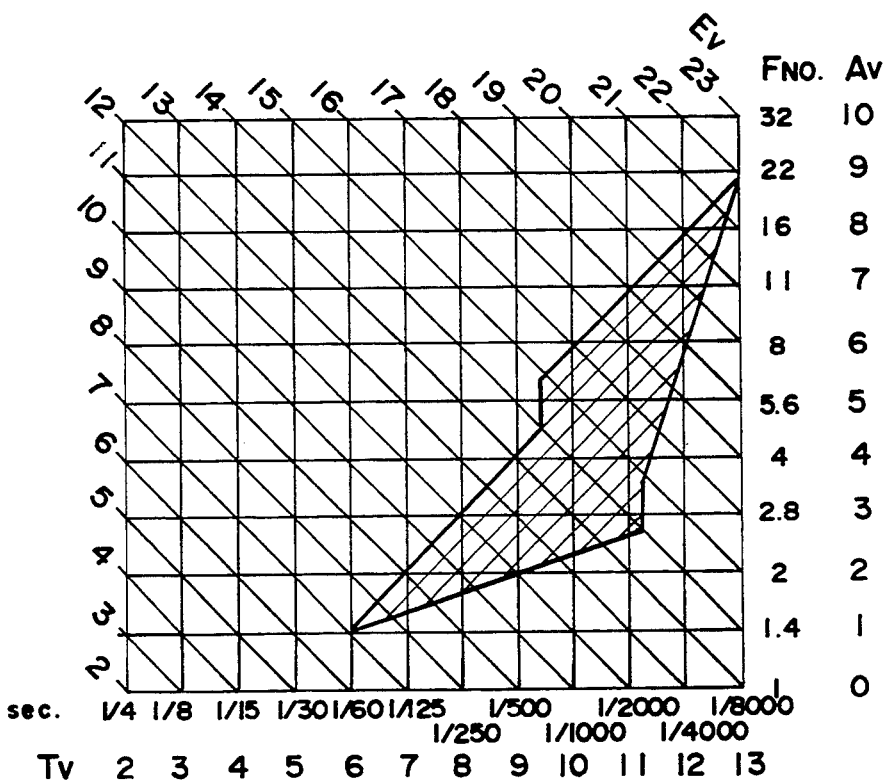

Then, when an object is detected to be moving, the above mentioned ratio a:b is limited to between 1:1 and 9:1. Namely, when the calculated ratio is between 1:9 and 1:1, it is changed to 1:1. Therefore, a range of combinations of a time value and an aperture value which can be determined is showned by the hatched area in FIG. 16.

The fifth embodiment

Figure 17:
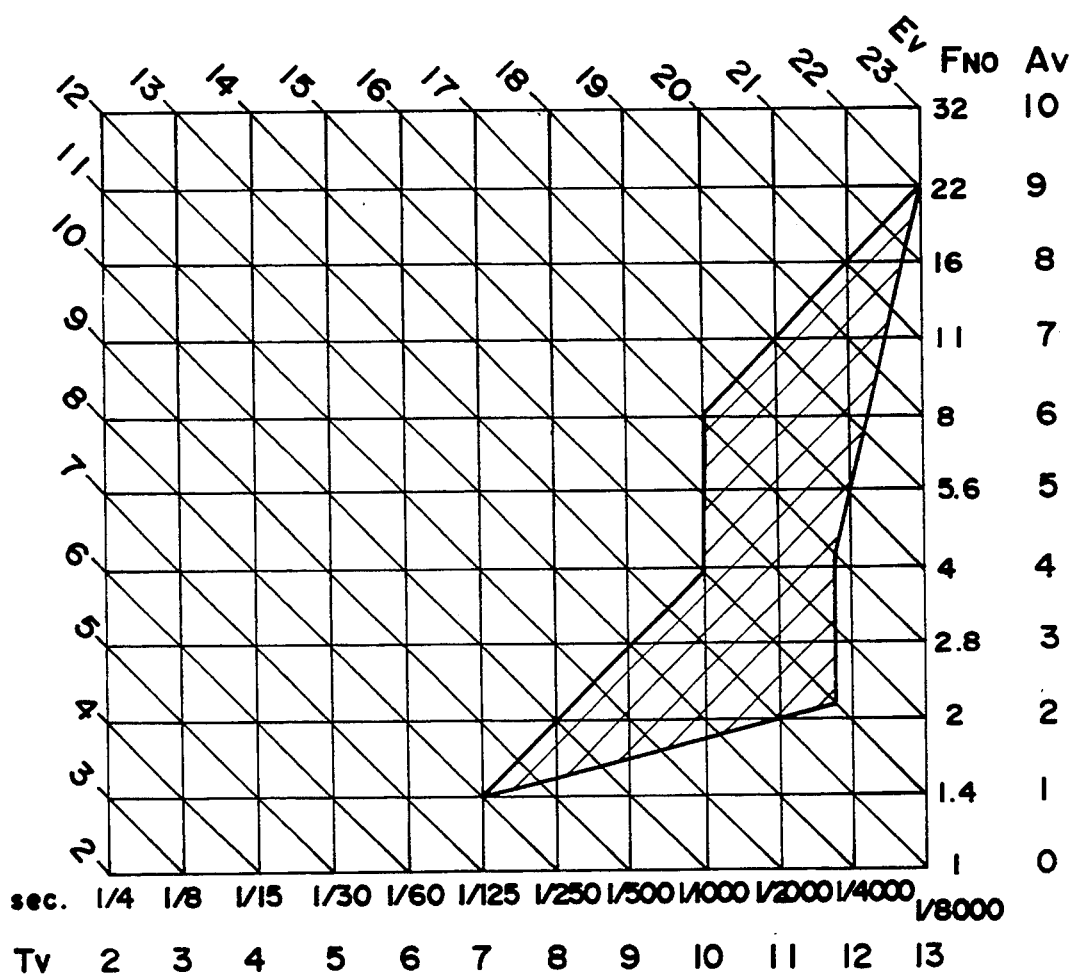
FIG. 17 is a program graph showing combinations of an aperture value Av and a time value Tv which are determined in the fifth embodiment.

The fifth embodiment is described hereinafter. Further to the fourth embodiment, when an object is detected to be moving, a lower limit time value at which camera shake will not blur a photograph can be set higher. The hatched area shown in FIG. 17 is a range of combinations of a time value and an aperture value in the case that a lower limit time value at which camera shake will not blur a photograph is changed to one step higher, that is, from 1/60 to 1/125.

Thus, by controlling a time value to be higher, a blur of an object image under exposure can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An exposure controlling device comprising:
    focal length detecting means for detecting the focal length of a photographing lens;
    distance detecting means for detecting distance to an object to be photographed;
    light measuring means for detecting an object brightness;
    calculating means for calculating an aperture value Av and a time value Tv on the basis of said focal length, distance and object brightness;
    limiting means for limiting respectively available ranges for setting an aperture value Av and a time value Tv;
    moving object detecting means for detecting whether or not the object is moving even when the camera is stable; and range changing means for changing said ranges according to the result of the detecting by said moving object detecting means.

2. An exposure controlling device as claimed in claim 1, wherein said calculating means comprises magnification calculating means for calculating image magnification, and calculates an aperture value Av and a time value Tv on the basis of said focal length, image magnification and object brightness.

3. An exposure controlling device as claimed in claim 1, wherein said changing means sets a first value for a lower limit value of a time value Tv when an object is not detected to be moving, and a second value larger than the first value for a lower limit value of a time value Tv when an object is detected to be moving.

4. An exposure controlling device, comprising:
means for detecting whether a scene to be photographed is suitable for portrait photography, in which depth of field is determined so that a foreground object is in focus and the focus of the background portion of the scene is not a factor;
means for determining a shutter speed and an aperture size appropriate to portrait photography when the detecting means detects that the scene is suitable for portrait photography;
means for carrying out an exposure operation according to the determined shutter speed and aperture size
first means for detecting the focal length of a photographing lens;
second means for detecting distance to an object; and
means for calculating a magnification on the basis of the focal length and the object distance.
wherein said detecting means carries out its detecting operation on the basis of the focal length and the magnification.

5. An exposure controlling device, comprising:
means for detecting whether a scene to be photographed is suitable for snapshot photography, in which a foreground object is in focus and the depth of field is as wide as possible to also bring background portions of the scene into focus;
means for determining a shutter speed and an aperture size appropriate to snapshot photography when the detecting means detects that the scene is suitable for snapshot photography;
means for carrying out an exposure operation according to the determined shutter speed and aperture size,
first means for detecting the focal length of a photographic lens;
second means for detecting distance to an object; and
means for calculating a a magnification on the basis of the focal length and the object distance.
wherein said detecting means carries out its detecting operation on the basis of the foal length and the magnification.

6. An exposure controlling device, comprising:
means for detecting whether a sense to be photographed is suitable for scenery photography, in which a landscape is in focus and the depth of field is made as wide as possible to also bring foreground objects into focus;
means for determining a shutter speed and an aperture size appropriate to scenery photography when the detecting means detects that the scene is suitable for scenery photography;

means for carrying out an exposure operation according to the determined shutter speed and aperture size;
first means for detecting the focal length of a photographing lens;
second means for detecting distance to an object; and
means for calculating a magnification on the basis of the focal length and the object distance.
wherein said detecting means carries out its detecting operation on the basis of the magnification.

7. An exposure controlling device, comprising:
means for detecting whether a scene to be photographed is suitable for close-up photography, in which an object is positioned close to a camera, on the basis of relation of a focal length and a magnification;
means for determining a shutter speed and aperture size appropriate to close-up photography when the detecting means detects that the scene is suitable for close-up photography; and
means for carrying out an exposure operation according to the determined shutter speed and aperture size.

8. An exposure controlling device as claimed in claim 7, further comprising:
first means for detecting the focal length of a photography lens;
second means for detecting distance to an object; and
means for calculating a magnification on the basis of the focal length and the object distance,
wherein said detecting means carries out its detecting operation on the basis of the magnification.

9. An exposure controlling device, comprising:
first means for detecting the focal length of a photography lens;
second means for detecting distance to an object;
means for calculating a magnification on the basis of the focal length and the object distance;
means for establishing a combination of the focal length and the magnification;
means for determining a shutter speed and an aperture size appropriate to the established combination; and
means for carrying out an exposure operation according to the determined shutter speed and aperture size.

10. An exposure controlling device, comprising:
first means for detecting the focal length of a photography lens;
second means for detecting distance to an object;
means for calculating a magnification on the basis of the focal length and the object distance;
means for selecting a type of photography on the basis of the magnification, said selecting means selecting the type of photography as either (a) scenery, in which a landscape is in focus and the depth of field is as wide as possible to also bring foreground objects into focus, (b) portrait, in which depth of field is determined so that a foreground object is in focus and the background portion of the scene is not a factor, or (c) close-up photography, in which an object is positioned close to a camera, in that order on the basis of the amount of magnification;
means for determining a shutter speed and aperture size appropriate to the selected type of photography; and means for carrying out an exposure operation according to the determined shutter speed and aperture size.

11. An exposure controlling device, comprising: first means for detecting the focal length of a photography lens;

second means for detecting distance to an object;

means for calculating a magnification on the basis of the focal length and the object distance;

means for detecting ranges for setting a shutter speed Tv and an aperture value Av;

means for allotting a shutter speed and an aperture value within the determined ranges to the exposure value in accordance with an allotting ratio;

means for changing the allotting ratio on an exposure line determined by the detected exposure value and the determined range, on the basis of the magnification; and means for carrying out an exposure operation according to the allotted shutter speed and aperture value.

12. An exposure controlling device for a camera, comprising:

first means for detecting brightness of an object;

second means for detecting whether the object is moving in the scene being photographed even when the camera is stable; and means for determining a shutter speed on the basis of the object brightness, said determining means selecting a higher shutter speed when the second detecting means detects the object is moving than the shutter speed selected when the object is not moving.

* * * * *